(12) United States Patent
Nishina et al.

(10) Patent No.: US 6,641,679 B2
(45) Date of Patent: Nov. 4, 2003

(54) FLUX FOR SOLDERING AND SOLDER COMPOSITION

(75) Inventors: Tsutomu Nishina, Kawasaki (JP); Kenji Okamoto, Kawasaki (JP)

(73) Assignee: Fuji Electric Co., Ltd., Kanagawa (JP)

( * ) Notice: Subject to any disclaimer, the term of this patent is extended or adjusted under 35 U.S.C. 154(b) by 0 days.

(21) Appl. No.: 09/999,190

(22) Filed: Dec. 3, 2001

(65) Prior Publication Data

US 2003/0051770 A1 Mar. 20, 2003

(30) Foreign Application Priority Data

Dec. 4, 2000 (JP) ........................................ 2000-369090
Nov. 29, 2001 (JP) ........................................ 2001-365281

(51) Int. Cl.⁷ ..................... B23K 35/365; B23K 35/368
(52) U.S. Cl. ........................................... 148/24; 148/23
(58) Field of Search ..................................... 148/23, 24

(56) References Cited

U.S. PATENT DOCUMENTS 5,417,771 A    5/1995   Arita et al.
5,904,782 A    5/1999   Diep-Quang
5,989,362 A   11/1999   Diamant et al.

FOREIGN PATENT DOCUMENTS

JP        10-034383        2/1998

*Primary Examiner*—Daniel J. Jenkins
(74) *Attorney, Agent, or Firm*—Venable LLP; Robert J. Frank; Keith G. Haddaway

(57) ABSTRACT

A soldering flux according to the present invention is a soldering flux containing an epoxy resin and an organic carboxylic acid, wherein the epoxy resin and the organic carboxylic acid are compounded at a ratio of 1.0 equivalent of epoxy group in the epoxy resin to 0.8–2.0 equivalent of carboxyl group in the organic carboxylic acid, and a total amount of the epoxy resin and the organic carboxylic acid is 70% or more by weight based on the total weight of the soldering flux. A lead-free solder composition according to the present invention is a solder composition containing the soldering flux and a lead-free solder. The soldering flux or the lead-free solder composition according to the present invention has special advantages of maintaining an activation by the flux, good wettability of the solder, and no inhibition of a sealing resin from curing.

20 Claims, No Drawings

FLUX FOR SOLDERING AND SOLDER COMPOSITION

This application is based on Patent Application Nos. 2000-369090 filed Dec. 4, 2000 and 2001-365281 filed Nov. 29, 2001 in Japan, the content of which is incorporated herein by reference.

BACKGROUND OF THE INVENTION

1. Field of the Invention

The present invention relates to a soldering flux and a solder composition containing the same.

2. Description of the Related Art

In many conventional soldering fluxes, an activator comprised of organic acids or halogenated salts are added to rosins and denatured resins of rosins. In many cases, however, such a flux can remains as a residue on a printed-circuit board after completion of soldering operation and the residues cause corrosion of substrate materials, migration, and etc. Furthermore, when the printed-circuit board on which the residue remains is sealed with a sealing resin (e.g. a silicone gel and an epoxy resin), the residue inhibits the sealing resin from curing, affecting adhesion to the substrate, as well as electrical insulation. In order to remove the residues, cleansing off with alternatives for chlorofluorocarbons, organic solvents and etc. is carried out after completion of soldering operation. However, cleaning agents have been regulated due to environmental problems concerning the chlorofluorocarbons, VOC and etc.

An epoxy flux is one of fluxes which cause no corrosion, migration, or inhibition of the sealing resin from curing, even if the residual flux is not cleansed off. The epoxy flux comprises an epoxy resin as a main component, an activator such as carboxylic acid, amines, a thixo agent and the others. When articles of the printed board are mounted with creamy solder using the epoxy flux, the curing reaction of the epoxy resin with the carboxylic acid are designed to be simultaneous with an activation of the conductor surface by the carboxylic acid during reflow soldering, and also designed to be completed around the time when the articles are adhered following melting the solder. After the reflow soldering, the cured epoxy resin remains as a residue. Contrary to the rosin flux which has been commonly used, such a cured epoxy resin does not inhibit the sealing resin from adhering to the printed board even if the sealing is carried out without cleansing off after soldering the article, and moreover, it has superior electrical insulation (see Japanese Patent Application Laid-Open No. 2000-216300).

However, there are some problems as described below.

The Conventional epoxy fluxes have been used for lead-containing solders. The initiation temperature of curing reaction between the epoxy resin and the activator in the conventional epoxy fluxes is about 150° C., slightly lower than the melting point of the lead containing solder (e.g. 63Sn-37Pb solder has a melting point of 183° C.), and the curing reaction is completed around the time when the lead containing solder is melted and the article is adhered.

However, if such a conventional epoxy flux is used for lead-free solders (i.e. the solder containing no lead component) having higher melting points than the lead containing solders such as Sn—Ag containing solders having melting points of about 220° C., much of the carboxylic acid (the activator) is consumed in the curing reaction with the epoxy resin prior to melting of the solder and the activating power of the carboxylic acid can not be maintained, resulting in lowered fluidity of the flux causing lowered wettability of the solder, and etc.

SUMMARY OF THE INVENTION

Accordingly, it is an object of the present invention to provide a soldering flux applicable to lead-free solder as well as a lead-free solder composition containing said soldering flux and the lead-free solder, wherein even if soldering is carried out with the lead-free solder having higher melting point than lead containing solder (e.g. lead-free solder having a melting point of 190–240° C.), the activation by the flux can be maintained, the solder has high wettability, and the sealing resin is not inhibited from curing even without cleansing off the residual flux.

The foregoing purpose of the present invention can be effectively achieved by providing a soldering flux containing an epoxy resin and an organic carboxylic acid, wherein said epoxy resin and said organic carboxylic acid are compounded at a ratio of 1.0 equivalent of epoxy group in said epoxy resin to 0.8–2.0 equivalent of carboxyl group in said organic carboxylic acid, and total amount of said epoxy resin and said organic carboxylic acid contained in said soldering flux is 70% or more by weight based on said total weight of said soldering flux.

Here, a temperature at the top of an exothermic peak in flux-curing reaction in which said epoxy resin and said organic carboxylic acid are polymerized may be 180–250° C.

Here, an initiation temperature of flux-curing reaction in which said epoxy resin and said organic carboxylic acid are polymerized may be 180–230° C.

Here, said epoxy resin and said organic carboxylic acid are compounded at a ratio of 1.0 equivalent of epoxy group in said epoxy resin to 0.8–1.1 equivalent of carboxyl group in said organic carboxylic acid.

Here, said total amount of said epoxy resin and said organic carboxylic acid contained in said soldering flux is 80% or more by weight based on said total weight of said soldering flux.

Here, alcohols may be further contained in an amount of 30% or less by weight based on said total weight of said soldering flux.

Here, alcohols may be further contained in an amount of 20% or less by weight based on said total weight of said soldering flux.

Here, said epoxy resin may be selected from the group consisting of bisphenol-A type epoxy resins, bisphenol-F type epoxy resins, novolac type epoxy resins, alicyclic epoxy resins and mixtures thereof.

Here, said bisphenol-A type epoxy resins is the bisphenol-A type epoxy resins having about 160 to 250 g/eq of epoxy equivalent.

Here, said carboxylic acid may be selected from the group consisting of saturated aliphatic dicarboxylic acids, unsaturated aliphatic dicarboxylic acids, alicyclic dicarboxylic acids, aromatic dicarboxylic acids, amino group containing carboxylic acids, hydroxyl group containing carboxylic acids, heterocyclic dicarboxylic acids and mixtures thereof.

Here, said carboxylic acid may be selected from the group consisting of succinic acid, glutaric acid, adipic acid, azelaic acid, dodecanoic diacid, itaconic acid, citraconic acid, mesaconic acid, cyclobutanedicarboxylic acid, cyclohexanedicarboxylic acid, cyclohexenedicarboxylic acid, cyclopentanetetracarboxylic acid, dimethylglutaric acid, methyladipic acid, glutamic acid, aspartic acid, ethylenediaminetetraacetic acid, citric acid, malic acid, tartaric acid, pyridinedicarboxylic acid, pyrazinedicarboxylic acid, diglycolic acid, phenylenediacetic acid, catecholdiacetic acid, hydroquinonediacetic acid, thiopropionic acid, thiodibutyl acid, dithioglycolic acid and mixtures thereof.

Here, said carboxylic acid may be selected from the group consisting of cyclohexenedicarboxylic acid, dimethylglutaric acid, glutamic acid, phthalic acid and mixtures thereof.

Here, said alcohols may be selected from the group consisting of monoalcohols, polyhydric alcohols, and mixture thereof.

Here, said polyhydric alcohol may be selected from the group consisting of ethylene glycol, diethylene glycol, triethylene glycol, propylene glycol, octene glycol, polyethylene glycol, propanediol, glycerin and mixtures thereof.

Here, said monoalcohol may be selected from the group consisting of methyl alcohol, ethyl alcohol, propyl alcohol, butyl alcohol, isobutyl alcohol, amyl alcohol, isoamyl alcohol, octanol, allyl alcohol, cyclohexanol and mixtures thereof.

According to another aspect of the present invention, there is provided a solder composition containing the aforementioned soldering flux and a lead-free solder having a melting point of 190–240° C.

Here, said lead-free solder may be a Sn containing lead-free solder having a melting point of 190–240° C.

The above and other objects, effects, features and advantages of the present invention will become more apparent from the following description of embodiments thereof.

DETAILED DESCRIPTION OF PREFERRED EMBODIMENTS

As described above, the soldering flux according to the present invention contains an epoxy resin and an organic carboxylic acid, wherein the epoxy resin flux and the organic carboxylic acid are compounded at a ratio of 1.0 equivalent of epoxy group in the epoxy resin to 0.8–2.0 equivalent of carboxyl group in the organic carboxylic acid, and the epoxy resin and the organic carboxylic acid is totally contained in an amount of 70% or more by weight based on the total weight of said soldering flux. The epoxy flux and the organic carboxylic acid are polymerized to cure the flux with increased temperature. For the flux of the present invention, the temperature at the top of an exothermic peak in the flux-curing reaction in which the epoxy resin and the organic carboxylic acid are polymerized is 180–250° C., preferably the initiation temperature of the flux-curing reaction in which the epoxy resin and the organic carboxylic acid are polymerized is 180–230° C. Therefore, even using the lead-free solder having high melting temperature (about 190–240° C.), much of the organic carboxylic acid, the activator, can be prevented from being consumed in the flux-curing reaction with the epoxy resin prior to melting of the lead-free solder. As a result, the activation can be maintained and the high wettability of the solder can be achieved, resulting in good soldering. Fluxes can be used as the flux of the present invention when the temperature at the top of the exothermic peak in the flux-curing reaction in which the epoxy resin and the organic carboxylic acid are polymerized is 180–250° C., even if the initiation temperature of the flux-curing reaction in which the epoxy resin and the organic carboxylic acid are polymerized is less than 180° C. However, fluxes that polymerization initiates at 130° C. or more is preferable in view of stability of preservation and etc.

Further, as described below, the epoxy resin and the organic carboxylic acid contained in the flux of the present invention can be used as mixture of more than one epoxy resin and/or more than one organic carboxylic acid. When such a mixture is used, each of the epoxy resin and the organic carboxylic acid contained in the mixture may have the aforementioned temperature at the top of the exothermic peak in the flux-curing reaction of polymerizing or initiation temperature of the flux-curing reaction of polymerizing. Alternatively, the epoxy resin and the organic carboxylic acid having aforementioned temperature at the top of the exothermic peak in the flux-curing reaction of polymerizing or the initiation temperature of the flux-curing reaction of polymerizing may be used as main components of the flux. The temperature at the top of the exothermic peak in the flux-curing reaction of polymerizing or the initiation temperature of the flux-curing reaction of polymerizing can be determined by differential scanning calorimetry (DSC) and etc (see Example).

According to the soldering flux of the present invention, the reasons why the epoxy resin and the organic carboxylic acid are compounded at a ratio of 1.0 equivalent of the epoxy group in the epoxy resin to 0.8–2.0 equivalent of the carboxyl group in the organic carboxylic acid is that the activation by the carboxylic acid become lowered to worsen the wettability of the solder when they are compounded at a ratio of less than 0.8% by weight of the carboxyl group in the organic carboxylic acid, while an excessive amount of the solid carboxylic acid worsens fluidity of the flux and etc. to worsen the wettability of solder and etc. when they are compounded at a ratio of more than 2.0% by weight of the carboxyl group in the organic carboxylic acid. Preferably, the epoxy resin and the organic carboxylic acid are compounded at a ratio of 1.0 equivalent of the epoxy group in the epoxy resin to 0.8–1.1 equivalent of the carboxyl group in the organic carboxylic acid, more preferably at a ratio of 1.0 equivalent of the epoxy group in the epoxy resin to 1.0 equivalent of the carboxyl group in the organic carboxylic acid. Furthermore, the reason why the total amount of the epoxy resin and the organic carboxylic acid contained in the soldering flux is 70% or more by weight based on the total weight of the soldering flux is that the activation by the carboxylic acid is decreased to reduce the wettability of the solder when less than 70% by weight. The total amount of the epoxy resin and the organic carboxylic acid contained in the flux is preferably 80% by weight, more preferably, 80–90% by weight based on the total weight of the soldering flux.

The epoxy resin used as a main material in the present invention may be in the form of liquid at room temperature and serves as solvent of the organic carboxylic acid in preparation of the flux, and polymerizes with the organic carboxylic acid to provide the cure of the flux as described above. The epoxy resin and the organic carboxylic acid are consumed in the above curing reaction to reduce the amount of the residual flux, allowing the flux to be used without cleaning it off after the soldering operation. In addition, the remaining epoxy resin as the residual flux is strongly bound with a sealing resin (e.g. silicone gel or epoxy resin) and the cured epoxy resin covers the soldered parts to reinforce the joint.

The epoxy resins contained in the present invention are preferably bisphenol-A type epoxy resins, bisphenol-F type epoxy resins, novolac type epoxy resins, alicyclic epoxy resins and mixtures thereof, more preferably bisphenol-A type epoxy resins, bisphenol-F type epoxy resins, alicyclic diglycidyl ester type epoxy resins. Preferably, the bisphenol-A type epoxy resins has about 160–250 g/eq of epoxy equivalent.

The organic carboxylic acid contained in the soldering flux of the present invention serves as an activator which can remove the metal oxide and etc. and is also used for the curing reaction with the aforementioned epoxy resin. The flux of the present invention does not require use of an activator (such as, amines, halogented activator, acid anhydride) other than the organic carboxylic acid. It provides good wettability with the solder even without an activator other than the organic carboxylic acid. In addition, the organic carboxylic acid sufficiently polymerizes with the epoxy resin to form the cured flux which has good electrical insulation after reflowing. Further, since the organic carboxylic acid is consumed in the curing reaction with the epoxy resin or in the reaction with the sealing resin, the flux is used without cleaning.

The carboxylic acid contained in the flux of the present invention may be an organic carboxylic acid having 2 or more functional groups, such as saturated aliphatic dicarboxylic acids, unsaturated aliphatic dicarboxylic acids, alicyclic dicarboxylic acids, aromatic dicarboxylic acids, amino group containing carboxylic acids, hydroxyl group containing carboxylic acids, heterocyclic dicarboxylic acids, and mixtures thereof. In more particular, the carboxylic acid may be succinic acid, glutaric acid, adipic acid, azelaic acid and dodecanoic diacid which are saturated aliphatic dicarboxylic acids; itaconic acid, citraconic acid and mesaconic acid which are unsaturated aliphatic dicarboxylic acids; cyclobutanedicarboxylic acid, cyclohexanedicarboxylic acid, cyclohexenedicarboxylic acid and cyclopentanetetracarboxylic acid which are alicyclic dicarboxylic acids; dimethylglutaric acid and methyladipic acid which are saturated aliphatic dicarboxylic acids having side chains; glutamic acid, aspartic acid and ethylene-diaminetetraacetic acid which are amino group containing carboxylic acids; citric acid, malic acid and tartaric acid which are hydroxyl group containing carboxylic acids; pyridinedicarboxylic acid and pyrazindicarboxylic acid which are heterocyclicdicarboxylic acids; diglycolic acid; phenylenediacetic acid; catecholdiacetic acid; hydroquinonediacetic acid; thiopropionic acid; thiodibutyl acid; dithioglycolic acid; and mixtures thereof. In view of improvements of properties of the flux, such as wetability of solder, stability of preservation, electrical insulation of the cured flux, as well as coating and printing properties and etc., the carboxylic acid is preferably selected from the group consisting of cyclohexanedicarboxylic acid, dimethylglutaric acid, glutamic acid, phthalic acid, itaconic acid and mixtures thereof.

The soldering flux according to the present invention may contain alcohols in an amount of 30% or less by weight based on the total weight of the soldering flux. When the alcohols is contained in an amount of more than 30% by weight of the flux, there is an inhibition of a sealing resin from curing, especially a silicone gel. Especially in view of improvement of the electrical insulation of the cured flux, the flux preferably contains alcohols in an amount of less than 20%, more preferably 10–20% by weight based on the total weight of the flux.

The alcohols contained in the flux of the present invention is used as a solvent and dissolves the carboxylic acid to lower the viscosity of the flux. Further, the alcohols do not remain as a residue since the epoxy resin also reacts with the alcohols. However, even if the flux of the present invention does not contain the alcohols, it can be used as the flux applicable to the lead-free solder. The alcohols contained in the soldering flux of the present invention may be monoalcohols, polyhydric alcohols, and mixtures thereof. Monoalcohols includes, for example, methyl alcohol, ethyl alcohol, propyl alcohol, butyl alcohol, isobutyl alcohol, amyl alcohol, isoamyl alcohol, octanol, allyl alcohol, cyclohexanol, and mixtures thereof. The Polyhydric alcohols includes, for example, ethylene glycol, diethylene glycol, triethylene glycol, propylene glycol, octene glycol, polyethylene glycol, glycerin, propanediol, and mixtures thereof. The use of polyhydric alcohols is preferable, and the use of a mixture of monoalcohols and polyhydric alcohols is more preferable. The mixture of monoalcohols and polyhydric alcohols has better electrical insulation of the cured flux after reflowing. Preferably, the mixture of monoalcohols and polyhydric alcohols is a mixture of monoalcohols selected from the group consisting of amyl alcohol, octanol, and mixtures thereof, and polyhydric alcohols selected from the group consisting of ethylene glycol, diethylene glycol, triethylene glycol, propylene glycol, polyethylene glycol, glycerin, propanediol, and mixtures thereof.

Furthermore, the present invention relates to a solder composition containing the above flux and a lead-free solder. The lead-free solder may be a lead-free solder having a melting point of about 190–240° C., preferably about 210–230° C. A preferred embodiment is Sn containing lead-free solder having a melting point of about 190–20° C. The Sn containing lead-free solder includes Sn solder, Sn—Ag containing solder, Sn—Cu containing solder, Sn—Zn containing solder, Sn—Sb containing solder (all of which have melting points of about 190–240° C.). The Sn—Ag containing solder is more preferable. The Sn—Ag containing solder includes Sn—Ag, Sn—Ag—Cu, Sn—Ag—Bi, Sn—Ag—Cu—Bi, Sn—Ag—Cu—In, Sn—Ag—Cu—S, Sn—Ag—Cu—Ni—Ge. The combination of the flux and the lead-free solder contained in the solder composition of the present invention may be selected from the combinations of fluxes and the lead-free solders which provide good properties of soldering such as wettability of the solder, wherein a preferable flux is a flux having a temperature at the top of the exothermic peak of the curing reaction which is equal to or less than the melting point of the solder, while the flux having a temperature at the top of the exothermic peak of the curing reaction which is about 10° C. more than the melting point of the solder also can be used. The solder compositions may be in any form such as cream or paste. Preferably, the solder is contained in the solder composition in an amount of about 85–95% by weight based on the total weight of the solder composition.

If necessary, a thixo agent, a chelating agent, a defoaming agent, a surfactant, an antioxidant and others may be added to the soldering flux and the solder composition of the present invention. With respect to the content of these components in the flux, it is preferable to contain 5% or less by weight of the thixo, 5% or less by weight of the chelating agent, 1% or less by weight of the defoaming agent, 2% or less by weight of the surfactant, 3% or less by weight of the antioxidant, based on the total amount of the solder composition.

The soldering flux of the present invention can be used without cleansing off in processes of a reflow soldering of electronic articles and etc. using the lead-free solder. For example, in the process of the reflow soldering of the electronic parts, the flux-curing reaction of polymerizing the epoxy resin and the organic carboxylic acid contained in the epoxy flux of the present invention is firstly initiated prior to melting of the lead-free solder, wherein the organic carboxylic acid, the activator of the flux, cleanses off a surface joined by the solder. Since the soldering flux of the present invention has an initiation temperature for the curing reaction of the flux of about 180–230° C. of the or about 180–250° C., preferably about 180–230° of the temperature at the top of the exothermic peak of the reaction even if the initiation temperature of the reaction is about 180° C. or less, much of the organic carboxylic acid is prevented from being consumed prior to melting of the lead-free solder. As a result, the activation force can be maintained and the high wettability of the solder can be achieved. The lead-free solder is then melted upon increased heating to achieve the soldering between the electronic part and the conductor pattern on the printed board, during which the flux-curing reaction is in progress. The flux-curing reaction is completed at almost the same time as completion of the soldering or completed by heating (curing of a sealing resin and etc.) after soldering. The cured epoxy resin covers the soldered parts to reinforce the joint.

A periphery area of the printed board is then sealed with the sealing resin (such as, an epoxy resin or a uretane resin) having functional groups which can react with the flux component of the present invention, without cleansing off the printed board, to cause the curing reaction of the residual carboxylic acid contained in the residual flux with the sealing resin, resulting in consumption of almost all of the carboxylic acid to reduce corrosion as well as strong binding of the epoxy resin which is a main component of the epoxy flux to the sealing resin. In addition, when the sealing is conducted with silicone gel (especially, addition-reaction type), there is an inhibition of the silicone gel in the conventional rosin flux, while there is no inhibition of the silicone gel in the flux of the present invention from curing even without cleansing off. Consequently, even with the lead-free solder having higher melting point than the lead containing solder, the epoxy flux of the present invention provides good wettability with the solder, provides high reliability on the electrical insulation with the cured flux, and causes no inhibition of the sealing resin from curing, even if the residual flux is not cleansed off after soldering.

Embodiments

The invention is demonstrated by following non-limiting examples and comparative examples.

In the following non-limiting examples and the comparative examples, the following measurement and evaluation were performed.

With respect to the reaction temperature of the flux, the temperature at which exothermic peak of the curing reaction appears (refereed to as "initiation temperature of the curing reaction") and the temperature at the top of the exothermic peak of the curing reaction are measured using differential scanning calorimetry (DSC) with 20° C. of an elevating temperature and about 10 mg of sample, in air.

The wettability of the solder is evaluated as percentage of the wettability of the solder according to JIS Z 3197-8.3.1.1. A reflowing is conducted under the heating condition in which heating of 250° C. was applied to the solder in soldering bath and kept for 30 seconds after melting the solder.

Stability of preservation is evaluated by measuring periodically the percentage of the wettability of the solder at 2 months intervals in refrigerator (about 5° C.).

Electrical insulation of the cured flux is evaluated by measuring periodically the resistance of electrical insulation using JIS-2 type electrical substrate under the DC 100 V applied voltage at 85° C. 85% R—H, using an apparatus of the 100 V electrical insulation. A reflowing is conducted under the heating condition in which substrates of electrodes in shapes of comb are placed on a hot plate having 250° C. on its surface and such a heating was kept for 30 seconds after melting the solder.

Whether the flux is inhibited from curing or not is evaluated by dropping the about 0.1 ml of silicone gel (TSE3051, from Toshiba silicone Co.) on the electrical substrate to cure (curing condition: 125° C./2 hours), followed by applying an almost equal force to the silicone gel using a pin with sharp tip to confirm whether a shape of the cured silicone gel is kept or not.

EXAMPLE 1

To 4.33 g of triethylene glycol was added 4.42 g of cis-4-cyclohexene-1,2-dicarboxylic acid, and the mixture was heated to about 130° C. to be melted. After he mixture was cooled to 100° C. or less, 10 g of a epoxy resin AER 260 (bisphenol-A type epoxy resin having 192 g/eq of the epoxy equivalent which is commercially available form Asahi Kasei Epoxy Co., Ltd.), which is relatively not expensive, was added to the mixture and stirred until homogeneous to prepare the flux of the present invention. The epoxy resin and the carboxylic acid contained in the flux were compounded at a ratio of 1 equivalent of the epoxy group to 1 equivalent of the carboxyl group, the total amount of the epoxy resin and the organic carboxylic acid was about 77% by weight based on the total of the flux, and alcohol was contained in an amount of about 23% by weight based on the total of the flux. After the flux was cooled to room temperature, the flux was mixed with a solder particle made of either Sn-2.5Ag-0.5Cu alloy (containing 97 wt % of Sn, 2.5 wt % of Ag and 0.5 wt % of Cu; m.p. 221° C.) or Sn-3.5Ag-0.5Cu-0.1Ni-0.05Ge alloy (95.85 wt % of Sn, 3.5 wt % of Ag, 0.5% wt % of Cu, 0.1 wt % of Ni and 0.05 wt % of Ge; m.p. 223° C.) to give a creamy solder composition. The above solder alloy was contained in the solder composition in an amount of 88% by weight based on the total weight of the solder composition. Although the initiation temperature of the curing reaction of the flux was 138° C., the activation by the carboxylic acid was maintained and the curing reaction progressed gradually since the temperature at the top of the exothermic peak was as high as 196° C. The solder had the good wettability, and there was no reduction of the wettability of the solder even after preserved for 4 months in the refrigerator, indicating the good stability of preservation. The electrical insulation of the flux was approximately $1.0 \times 10^8$ Ω at 85° C. 85% R—H, while there was no reduction of the electrical insulation even after 168 hours. Furthermore, there was no inhibition of the sealing resin of the silicone gel from curing even if the residual flux was not cleansed off, indicating that the good soldering of the lead-free solder was achieved without cleansing off the flux. Table 1 shows the compounding ratio and properties of the flux and properties of the solder composition of the present invention used in this example.

EXAMPLE 2

Soldering was carried out in a way similar to Example 1, using 2,2-dimethylgultaric acid which is relatively not expensive instead of cis-4-cyclohexene-1,2-dicarboxylic acid in the Example 1. Although the initiation temperature of the curing reaction of the flux was 173° C., the activation by the carboxylic acid was maintained and the curing reaction was progressed gradually since the temperature at the top of the exothermic peak was as high as 220° C. Likewise the above Example, the good wettability of the solder as well as the good stability of preservation were achieved. The electrical insulation of the flux was approximately $6.0 \times 10^7$ Ω at 85° C. 85% R—H, while there was no reduction of the electrical insulation even after 168 hours. In addition, there was no inhibition of the sealing resin of the silicone gel from curing even if the residual flux was not cleansed off, indicating that the good soldering of the lead-free solder was achieved without cleansing off the flux. Table 1 shows the compounding ratio and properties of the flux and properties of the solder composition of the present invention used in this example.

EXAMPLE 3

Soldering was carried out in a way similar to Example 1, using L-glutamic acid which is relatively not expensive instead of cis-4-cyclohexene-1,2-dicarboxylic acid in the Example 1. Since L-gultamic acid is insoluble in triethylene glycol, it was previously ground to fined powders in a mortar prior to addition to the alcohol, and then dispersed when mixed. Since the initiation temperature of the reaction of the flux was 214° C., the activation by the carboxylic acid was maintained and the curing reaction progressed. Likewise the above Example, the good wettability of the solder as well as the good stability of preservation were achieved. The electrical insulation of the flux was approximately $2.0 \times 10^7$ Ω at 85° C. 85% R—H, while there was no reduction of the electrical insulation even after 168 hours. In addition, there was no inhibition of the sealing resin of the silicone gel from curing even if the residual flux was not cleansed off, indicating that the good soldering of the lead-free solder was achieved without cleansing off the flux. Table 1 shows the compounding ratio and properties of the flux and properties of the solder composition of the present invention used in this example.

EXAMPLE 4

Soldering was carried out in a way similar to Example 1, using ethylene glycol and trans-1,2-cyclehexanedicarboxylic acid which is relatively not expensive instead of triethylene glycol and cis-4-cyclohexene-1,2-dicarboxylic acid in the Example 1, respectively. Although the initiation temperature of the curing reaction of the flux was 150° C., the activation by the carboxylic acid was maintained and the curing reaction progressed gradually since the temperature at the top of the exothermic peak was as high as 220° C. Likewise the above Example, the good wettability of the solder as well as the good stability of preservation were achieved. The electrical insulation of the flux was approximately $3.0 \times 10^7$ Ω at 85° C. 85% R—H, while there was no reduction of the electrical insulation even after 168 hours. In addition, there was no inhibition of the sealing resin of the silicone gel from curing even if the residual flux was not cleansed off, indicating that the good soldering of the lead-free solder was achieved without cleansing off the flux. Table 1 shows the compounding ratio and properties of the flux and properties of the solder composition of the present invention used in this example.

EXAMPLE 5

Soldering was carried out in a way similar to Example 1, using itaconic acid which is relatively not expensive instead of cis-4-cyclohexene-1,2-dicarboxylic acid used in the Example 1. Although the initiation temperature of the curing reaction of the flux was 126° C., the activation by the carboxylic acid was maintained and the curing reaction progressed gradually since the temperature at the top of the exothermic peak was as high as 209° C. Likewise the above Example, the good wettability of the solder as well as the good electrical insulation were achieved, although the stability of preservation was slightly worsen. In addition, there was no inhibition of the sealing resin of the silicone gel from curing even if the residual flux was not cleansed off, indicating that the good soldering of the lead-free solder was achieved without cleansing off the flux. Table 2 shows the compounding ratio and properties of the flux and properties of the solder composition of the present invention used in this example (A mark of (-) in the Table represents the portion that is not measured).

EXAMPLE 6

Soldering was carried out in a way similar to Example 1, using succinic acid which is relatively not expensive instead of cis-4-cyclohexene-1,2-dicarboxylic acid in the Example 1. Although the initiation temperature of the curing reaction of the flux was 123° C., the activation by the carboxylic acid was maintained and the curing reaction progressed gradually since the temperature at the top of the exothermic peak was as high as 206° C. Likewise the above Example, the good wettability of the solder as well as the good electrical insulation were achieved, although the stability of preservation was slightly worsen. In addition, there was no inhibition of the sealing resin of the silicone gel from curing even if the residual flux was not cleansed off, indicating that good soldering of the lead-free solder was achieved without cleansing off the flux. Table 2 shows the compounding ratio and properties of the flux and properties of the solder composition of the present invention used in this example.

EXAMPLE 7

Soldering was carried out in a way similar to Example 1, using 1,2-phenylenediacetic acid which is relatively not expensive instead of cis-4-cyclohexene-1,2-dicarboxylic acid in the Example 1. Although the initiation temperature of the curing reaction of the flux was 119° C., the activation by the carboxylic acid was maintained and the curing reaction progressed gradually since the temperature at the top of the exothermic peak was as high as 203° C. Likewise the above Example, the good wettability of the solder was obtained, although the stability of preservation was slightly worsen. The electrical insulation of the flux was approximately $7.0 \times 10^7$ Ω at 85° C. 85% R—H, while there was no reduction of the electrical insulation even in 168 hours. In addition, there was no inhibition of the sealing resin of the silicone gel from curing even if the residual flux was not cleansed off, indicating that good soldering of the lead-free solder was achieved without cleansing off the flux. Table 2 shows the compounding ratio and properties of the flux and properties of the solder composition of the present invention used in this example.

EXAMPLE 8

Soldering was carried out in a way similar to Example 1, using AER 280 (bisphenol-A type epoxy resin having 250 g/eq of the epoxy equivalent) which is relatively not expensive, instead of AER 260 (bisphenol-A type epoxy resin having 192 g/eq of the epoxy equivalent) in the Example 1. Although the initiation temperature of the curing reaction of the flux was 123° C., the activation by the carboxylic acid was maintained and the curing reaction progressed gradually since the temperature at the top of the exothermic peak was as high as 206° C. Likewise the above Example, the good wettability of the solder as well as the good stability of preservation were achieved. The electrical insulation of the flux was approximately $8.0 \times 10^7$ Ω at 85° C. 85% R—H, while there was no reduction of the electrical insulation even after 168 hours. In addition, there was no inhibition of the sealing resin of the silicone gel from curing even if the residual flux was not cleansed off, indicating that the good soldering of the lead-free solder was achieved without cleansing off the flux. Table 2 shows the compounding ratio and properties of the flux and properties of the solder composition of the present invention used in this example.

EXAMPLE 9

Soldering was carried out in a way similar to Example 1, using EP 4091E (bisphenol-F type epoxy resin having 170 g/eq of the epoxy equivalent, available from Asahi Electrical and Chemistry Industry Co.) which is relatively not expensive, instead of AER 260 (bisphenol-A type epoxy resin having 192 g/eq of the epoxy equivalent) in the Example 1. Although the initiation temperature of the curing reaction of the flux was 143° C., the activation by the carboxylic acid was maintained and the curing reaction progressed gradually since the temperature at the top of the exothermic peak was as high as 196° C. Likewise the above Example, the good wettability of the solder as well as the good stability of preservation were achieved. The electrical insulation of the flux was approximately $7.0 \times 10^7$ Ω at 85° C. 85% R—H, while there was no reduction of the electrical insulation even after 168 hours. In addition, there was no inhibition of the sealing resin of the silicone gel from curing even if the residual flux was not cleansed off, indicating that the good soldering of the lead-free solder was achieved without cleansing off the flux. Table 3 shows the compounding ratio and properties of the flux and properties of the solder composition of the present invention used in this example.

EXAMPLE 10

Soldering was carried out in a way similar to Example 1, using 5.77 g of an increased amount of added triethylene glycol (27 wt % based on the total amount of the flux in the present Example) instead of 4.33 g of the added triethylene glycol in the Example 1 (23 wt % based on the total amount of the flux in the Example 1). Likewise the above Example, the good wettability of the solder as well as the good stability of preservation were achieved. The electrical insulation of the flux was approximately $2.0 \times 10^7$ Ω at 85° C. 85% R—H, while there was no reduction of the electrical insulation even after 168 hours. In addition, there was no inhibition of the sealing resin of the silicone gel from curing even if the residual flux was not cleansed off, indicating that the good soldering of the lead-free solder was achieved without cleansing off the flux. Table 3 shows the compounding ratio and properties of the flux and properties of the solder composition of the present invention used in this example.

EXAMPLE 11

Soldering was carried out in a way similar to Example 1, so that the epoxy resin AER 260 and cis-4-cyclohexene-1,2-dicarboxylic acid in the Example 1 were compounded at a ratio of 1 equivalent of the epoxy group to 1.2 equivalent of the carboxylic group. Likewise the above Example, the good wettability of the solder as well as the good stability of preservation were achieved. The electrical insulation of the flux was approximately $2.8 \times 10^7$ Ω at 85° C. 85% R—H, while there was no reduction of the electrical insulation even after 168 hours. In addition, there was no inhibition of the sealing resin of the silicone gel from curing even if the residual flux was not cleansed off, indicating that the good soldering of the lead-free solder was achieved without cleansing off the flux. Table 3 shows the compounding ratio and properties of the flux and properties of the solder composition of the present invention used in this example.

EXAMPLE 12

Soldering was carried out in a way similar to Example 1, using 2.89 g of reduced amount of added triethylene glycol (17 wt % based on the total amount of the flux in the present Example) instead of 4.33 g of the added triethylene glycol in the Example 1 (23 wt % based on the total amount of the flux in the Example 1). Likewise the above Example, the good wettability of the solder, the good stability of preservation, and the good electrical insulatino of the cured flux were achieved. In addition, there was no inhibition of the sealing resin of the silicone gel from curing even if the residual flux was not cleansed off, indicating that the good soldering of the lead-free solder was achieved without cleansing off the flux. Table 4 shows the compounding ratio and properties of the flux and properties of the solder composition of the present invention used in this example.

EXAMPLE 13

Soldering was carried out in a way similar to Example 2, using 2.83 g of reduced amount of added triethylene glycol (17 wt % based on the total amount of the flux in the present Example) instead of 4.25 g of the added triethylene glycol in the Example 1 (23 wt % based on the total amount of the flux in the Example 2). Likewise the above Example, good wettability of the solder, the good stability of preservation, and the good electrical insulatino of the cured flux were achieved. In addition, there was no inhibition of the sealing resin of the silicone gel from curing even if the residual flux was not cleansed off, indicating that the good soldering of the lead-free solder was achieved without cleansing off the flux. Table 4 shows the compounding ratio and properties of the flux and properties of the solder composition of the present invention used in this example.

EXAMPLE 14

Soldering was carried out in a way similar to Example 1, using a mixture of 2.72 g of cis-4-cyclohexene-1,2-dicarboxylic acid and 1.77 g of phthalic acid which is relatively not expensive instead of 4.42 g of cis-4-cyclohexene-1,2-dicarboxylic acid in the Example 1, using a mixture of 8.19 g of AER and 1.81g of CY184 (diglycidyl ester type epoxy resin having 170g/eq, available from Bnnthiko Co.) instead of 10 g of AER 260 in the Example 1, and using a mixture of 0.87 g of triethylene glycol and 1.33 g of amylalcohol instead of 4.33 g of triethylene glycol in the Example 1. The initiation temperature of the curing reaction of the flux was 125° C., and the temperature at the top of the exothermic peak was in the range of 181–200° C. The activation by the carboxylic acid was maintained and the curing reaction progressed gradually. Likewise the above Example, the good wettability of the solder, the good stability of preservation, and the good electrical insulation of the cured flux were achieved. In addition, there was no inhibition of the sealing resin of the silicone gel from curing even if the residual flux was not cleansed off, indicating that the good soldering of the lead-free solder was achieved without cleansing off the flux. Table 4 shows the compounding ratio and properties of the flux and properties of the solder composition of the present invention used in this example.

EXAMPLE 15

Soldering was carried out in a way similar to Example 1, using a mixture of 1.77 g of cis-4-cyclohexene-1,2-dicarboxylic acid, 1.15 g of L-gultamic acid and 1.25 g of 2,2-dimethylgultaric acid instead of 4.42g of cis-4-cyclohexene-1,2-dicarboxylic acid instead of 4.42 g of cis-4-cyclohexene-1,2-dicarboxylic acid in the Example 1, and using 2.84 g of triethylene glycol instead of 4.33 g of triethylene glycol in the Example 1. Although the initiation temperature of the curing reaction of the flux was 142° C., the activation by the carboxylic acid was maintained and the curing reaction progressed gradually since the temperature at the top of the exothermic peak was as high as 202° C. The activation by the carboxylic acid was maintained and the curing reaction progressed gradually. Likewise the above Example, the good wettability of the solder, the good stability of preservation, and the good electrical insulation of the cured flux were achieved. In addition, there was no inhibition of the sealing resin of the silicone gel from curing even if the residual flux was not cleansed off, indicating that the good soldering of the lead-free solder was achieved without cleansing off the flux. Table 5 shows the compounding ratio and properties of the flux and properties of the solder composition of the present invention used in this example.

EXAMPLE 16

Soldering was carried out in a way similar to Example 1, using a mixture of 1.77 g of cis-4-cyclohexene-1,2-dicarboxylic acid, 1.15 g of L-gultamic acid and 1.25 g of 2,2-dimethylgultaric acid instead of 4.42g of cis-4-cyclohexene-1,2-dicarboxylic acid instead of 4.42 g of cis-4-cyclohexene-1,2-dicarboxylic acid in the Example 1, and using a mixture of 0.43 g of triethylene glycol and 1.28 g of amylalcohol instead of 4.33 g of triethylene glycol in the Example 1. Although the initiation temperature of the curing reaction of the flux was 140° C., the activation by the carboxylic acid was maintained and the curing reaction progressed gradually since the temperature at the top of the exothermic peak was as high as 200° C. The activation by the carboxylic acid was maintained and the curing reaction progressed gradually. Likewise the above Example, the good wettability of the solder, the good stability of preservation, and the good electrical insulation of the cured flux were achieved. In addition, there was no inhibition of the sealing resin of the silicone gel from curing even if the residual flux was not cleansed off, indicating that the good soldering of the lead-free solder was achieved without cleansing off the flux. Table 5 shows the compounding ratio and properties of the flux and properties of the solder composition of the present invention used in this example.

EXAMPLE 17

Soldering was carried out in a way similar to Example 1, using a mixture of 1.77 g of cis-4-cyclohexene-1,2-dicarboxylic acid, 1.15 g of L-gultamic acid and 1.25 g of 2,2-dimethylgultaric acid instead of 4.42 g of cis-4-cyclohexene-1,2-dicarboxylic acid instead of 4.42 g of cis-4-cyclohexene-1,2-dicarboxylic acid in the Example 1, and using a mixture of 0.86 g of triethylene glycol and 1.29 g of amylalcohol instead of 4.33 g of triethylene glycol in the Example 1. The initiation temperature of the curing reaction of the flux was 128° C., and the temperature at the top of the exothermic peak was in the range of 185–203° C. The activation by the carboxylic acid was maintained and the curing reaction progressed gradually. The activation by the carboxylic acid was maintained and the curing reaction progressed gradually. Likewise the above Example, the good wettability of the solder, the good stability of preservation, and the good electrical insulation of the cured flux were achieved. In addition, there was no inhibition of the sealing resin of the silicone gel from curing even if the residual flux was not cleansed off, indicating that the good soldering of the lead-free solder was achieved without cleansing off the flux. Table 6 shows the compounding ratio and properties of the flux and properties of the solder composition of the present invention used in this example.

EXAMPLE 18

Soldering was carried out in a way similar to Example 1, using a mixture of 1.81 g of cis-4-cyclohexene-1,2-dicarboxylic acid, 059 g of L-gultamic acid, 0.66 g of phthalic acid and 1.28g of 2,2-dimethylgultaric acid instead of 4.42 g of cis-4-cyclohexene-1,2-dicarboxylic acid in the Example 1, using a mixture of 8.19 g of AER and 1.81g of CY184 (diglycidil ester type epoxy resin having 170g/eq, available from Bnnthiko Co.) instead of 10 g of AER 260 in the Example 1, and using a mixture of 0.86 g of triethylene glycol and 1.29 g of amylalcohol instead of 4.33 g of triethylene glycol in the Example 1. The initiation temperature of the curing reaction of the flux was 132° C., and the temperature at the top of the exothermic peak was in the range of 190–210° C. The activation by the carboxylic acid was maintained and the curing reaction progressed gradually. Likewise the above Example, the good wettability of the solder, the good stability of preservation, and the good electrical insulation of the cured flux were achieved. In addition, there was no inhibition of the sealing resin of the silicone gel from curing even if the residual flux was not cleansed off, indicating that the good soldering of the lead-free solder was achieved without cleansing off the flux. Table 6 shows the compounding ratio and properties of the flux and properties of the solder composition of the present invention used in this example.

TABLE 1

| Example No. | | Example 1 | Example 2 | Example 3 | Example 4 |
| --- | --- | --- | --- | --- | --- |
| Flux components | Carboxylic Acid | Cis-4-cyclo-hexene-1,2-dicarboxylic acid (4.42 g) | 2,2-dimeth-ylgultaric acid (4.16 g) | L-gultamic acid (3.83 g) | Trans-1,2-cyclohexanedic arboxylic acid (4.48 g) |
| | Epoxy Resin | AER260 (10 g) | AER260 (10 g) | AER260 (10 g) | AER260 (10 g) |
| | Alcohol | Triethylene glycol (4.33 g) | Triethylene glycol (4.25 g) | Triethylene glycol (4.15 g) | Ethylene glycol (4.34 g) |

TABLE 1-continued

| Example No. | | Example 1 | Example 2 | Example 3 | Example 4 |
|---|---|---|---|---|---|
| Ratio of Equivalent of Carboxylic Group | | 1 | 1 | 1 | 1 |
| Ratio of Equivalent of Epoxy group | | 1 | 1 | 1 | 1 |
| Amount of Alcohol (wt %) | | 23 | 23 | 23 | 23 |
| Initiation Temperature of Reaction | | 138 | 173 | 214 | 150 |
| Temperature at the top of Exothermic Peak | | 196 | 220 | 228 | 220 |
| Solder | | Sn—Ag—Cu—Ni—Ge | Sn—Ag—Cu—Ni—Ge | Sn—Ag—Cu—Ni—Ge | Sn—Ag—Cu—Ni—Ge |
| Ratio of Wetting Spreading (%) | Initiation | 87.5 | 85.9 | 83.9 | 85.5 |
| | 2 months | 87.2 | 84.9 | 81.1 | 84.1 |
| | 4 months | 87.6 | 83.0 | 80.9 | 83.2 |
| Solder | | Sn—Ag—Cu | Sn—Ag—Cu | Sn—Ag—Cu | Sn—Ag—Cu |
| Ratio of Wetting Spreading (%) | Initiation | 83.2 | 85.0 | 81.1 | 82.3 |
| | 2 months | 83.6 | 84.2 | 81.1 | 82.0 |
| | 4 months | 84.0 | 83.8 | 79.8 | 82.0 |
| Electrical Insulation ($\Omega$) | Initiation | $8.0 \times 10^7$ | $6.0 \times 10^7$ | $2.0 \times 10^7$ | $3.0 \times 10^7$ |
| | 168 hours | $1.0 \times 10^8$ | $1.5 \times 10^8$ | $2.0 \times 10^7$ | $4.0 \times 10^7$ |
| Inhibition of silicone gel from curing | | No inhibition | No inhibition | No inhibition | No inhibition |

TABLE 2

| Example No. | | | Example 5 | Example 6 | Example 7 | Example 8 |
|---|---|---|---|---|---|---|
| Flux components | Carboxylic Acid | | Itaconic acid (4.38 g) | Succinic acid (3.08 g) | 1,2-phenyl-enediacetic acid (5.05 g) | Cis-4-cyclo-hexene-1,2-dicarboxylic acid (3.32 g) |
| | Epoxy Resin | | AER260 (10 g) | AER260 (10 g) | AER260 (10 g) | AER280 (10 g) |
| | Alcohol | | Triethylene glycol (4.01 g) | Triethylene glycol (3.92 g) | Triethylene glycol (4.52 g) | Triethylene glycol (4.00 g) |
| Ratio of Equivalent of Carboxylic Group | | | 1 | 1 | 1 | 1 |
| Ratio of Equivalent of Epoxy group | | | 1 | 1 | 1 | 1 |
| Amount of Alcohol (wt %) | | | 23 | 23 | 23 | 23 |
| Initiation Temperature of Reaction | | | 121 | 123 | 119 | 138 |
| Temperature at the top of Exothermic Peak | | | 209 | 206 | 203 | 202 |
| Solder | | | Sn—Ag—Cu—Ni—Ge | Sn—Ag—Cu—Ni—Ge | Sn—Ag—Cu—Ni—Ge | Sn—Ag—Cu—Ni—Ge |
| Ratio of Wetting Spreading (%) | Initiation | | 83.6 | 80.3 | 82.3 | 86.7 |
| | 2 months | | 73.8 | 75.3 | 72.8 | 87.6 |
| | 4 months | | — | — | — | 85.7 |
| Solder | | | Sn—Ag—Cu | Sn—Ag—Cu | Sn—Ag—Cu | Sn—Ag—Cu |
| Ratio of Wetting Spreading (%) | Initiation | | 80.9 | — | — | 85.3 |
| | 2 months | | 71.2 | — | — | 85.3 |
| | 4 months | | — | — | — | — |
| Electrical Insulation ($\Omega$) | Initiation | | $1.3 \times 10^8$ | $1.0 \times 10^8$ | $7.0 \times 10^7$ | $8.0 \times 10^7$ |
| | 168 hours | | $8.0 \times 10^8$ | $2.0 \times 10^8$ | $7.0 \times 10^7$ | $1.0 \times 10^8$ |
| Inhibition of silicone gel from curing | | | No inhibition | No inhibition | No inhibition | No inhibition |

TABLE 3

| Example No. | | Example 9 | Example 10 | Example 11 |
|---|---|---|---|---|
| Flux components | Carboxylic Acid | Cis-4-cyclohexene-1,2-dicarboxylic acid (5.00 g) | Cis-4-cyclohexene-1,2-dicarboxylic acid (4.43 g) | Cis-4-cyclohexene-1,2-dicarboxylic acid (5.32 g) |
| | Epoxy Resin | EP4901E (10 g) | AER260 (10 g) | AER260 (10 g) |
| | Alcohol | Triethylene glycol (4.50 g) | Triethylene glycol (5.77 g) | Triethylene glycol (3.06 g) |
| Ratio of Equivalent of Carboxylic Group | | 1 | 1 | 1.2 |
| Ratio of Equivalent of Epoxy group | | 1 | 1 | 1 |
| Amount of Alcohol (wt %) | | 23 | 29 | 17 |
| Initiation Temperature of Reaction | | 143 | 136 | 142 |
| Temperature at the top of Exothermic Peak | | 196 | 200 | 200 |
| Solder | | Sn—Ag—Cu—Ni—Ge | Sn—Ag—Cu—Ni—Ge | Sn—Ag—Cu—Ni—Ge |
| Ratio of Wetting Spreading (%) | Initiation | 87.2 | 89.0 | 88.3 |
| | 2 months | 87.6 | 88.3 | 86.9 |
| | 4 months | 87.3 | 88.8 | 87.0 |
| Solder | | Sn—Ag—Cu | Sn—Ag—Cu | Sn—Ag—Cu |
| Ratio of Wetting Spreading (%) | Initiation | — | — | — |
| | 2 months | — | — | — |
| | 4 months | — | — | — |
| Electrical Insulation ($\Omega$) | Initiation | $7.0 \times 10^7$ | $2.0 \times 10^7$ | $2.8 \times 10^7$ |
| | 168 hours | $1.0 \times 10^8$ | $2.0 \times 10^7$ | $2.0 \times 10^7$ |
| Inhibition of silicone gel from curing | | No inhibition | No inhibition | No inhibition |

TABLE 4

| Example No. | | Example 12 | Example 13 | Example 14 |
|---|---|---|---|---|
| Flux components | Carboxylic Acid | Cis-4-cyclohexene-1,2-dicarboxylic acid (4.43 g) | 2,2-dimethyl-gultaric acid (4.17 g) | Cis-4-cyclohexene-1,2-dicarboxylic acid (2.72 g) + phthalic acid (1.77 g) |
| | Epoxy Resin | AER260 (10 g) | AER260 (10 g) | AER260 (8.19 g) + CY184 (1.81 g) |
| | Alcohol | Triethylene glycol (2.89 g) | Triethylene glycol (2.83 g) | Triethylene glycol (0.87 g) + Amylalcohol (1.30 g) |
| Ratio of Equivalent of Carboxylic Group | | 1 | 1 | 0.6 + 0.4 |
| Ratio of Equivalent of Epoxy group | | 1 | 1 | 0.8 + 0.2 |
| Amount of Alcohol (wt %) | | 17 | 17 | 5 + 8 |
| Initiation Temperature of Reaction | | 139 | 175 | 125 |
| Temperature at the top of Exothermic Peak | | 197 | 218 | 181~200 |
| Solder | | Sn—Ag—Cu—Ni—Ge | Sn—Ag—Cu—Ni—Ge | Sn—Ag—Cu—Ni—Ge |
| Ratio of Wetting | Initiation | 87.7 | 86.3 | 87.3 |
| | 2 months | 86.9 | 85.3 | 88.0 |

TABLE 4-continued

| Example No. | | Example 12 | Example 13 | Example 14 |
|---|---|---|---|---|
| Spreading (%) | 4 months | 87.3 | 84.6 | 87.2 |
| Solder | | Sn—Ag—Cu | Sn—Ag—Cu | Sn—Ag—Cu |
| Ratio of | Initiation | 86.5 | 85.2 | 85.3 |
| Wetting | 2 months | 86.9 | 85.1 | 85.8 |
| Spreading (%) | 4 months | 86.1 | 84.1 | 86.3 |
| Electrical | Initiation | $1.2 \times 10^8$ | $1.0 \times 10^8$ | $1.0 \times 10^9$ |
| Insulation ($\Omega$) | 168 hours | $6.0 \times 10^8$ | $2.0 \times 10^8$ | $4.0 \times 10^9$ |
| Inhibition of silicone gel from curing | | No inhibition | No inhibition | No inhibition |

TABLE 5

| Example No. | | Example 15 | Example 16 | |
|---|---|---|---|---|
| Flux components | Carboxylic Acid | Cis-4-cyclohexene-1,2-dicarboxylic acid (1.77 g) + L-gultamic acid (1.15 g) + 2,2-dimethylgultaric acid (1.25 g) | Cis-4-cyclohexene-1,2-dicarboxylic acid (1.77 g) + L-gultamic acid (1.15 g) + 2,2-dimethylgultaric acid (1.25 g) | |
| | Epoxy Resin | AER260 (10 g) | AER260 (10 g) | |
| | Alcohol | Triethylene glycol (2.84 g) | Triethylene glycol (0.43 g) + Amyalcohol (1.28 g) | |
| Ratio of Equivalent of Carboxylic Group | | 0.4 + 0.3 + 0.3 | 0.4 + 0.3 + 0.3 | |
| Ratio of Equivalent of Epoxy group | | 1 | 1 | |
| Amount of Alcohol (wt %) | | 17 | 3 + 8 | |
| Initiation Temperature of Reaction | | 142 | 140 | |
| Temperature at the top of Exothermic Peak | | 202 | 200 | |
| Solder | | Sn—Ag—Cu—Ni—Ge | Sn—Ag—Cu—Ni—Ge | |
| Ratio of | Initiation | 89.1 | 90.1 | |
| Wetting | 2 months | 88.6 | 90.6 | |
| Spreading (%) | 4 months | 89.0 | 90.3 | |
| Solder | | Sn—Ag—Cu | Sn—Ag—Cu | |
| Ratio of | Initiation | 87.3 | 88.3 | |
| Wetting | 2 months | 86.5 | 86.3 | |
| Spreading (%) | 4 months | 87.0 | 87.3 | |
| Electrical | Initiation | $1.0 \times 10^8$ | $3.0 \times 10^8$ | |
| Insulation ($\Omega$) | 168 hours | $6.0 \times 10^8$ | $8.0 \times 10^8$ | |
| Inhibition of silicone gel from curing | | No inhibition | No inhibition | |

TABLE 6

| Example No. | | Example 17 | Example 18 |
|---|---|---|---|
| Flux components | Carboxylic Acid | Cis-4-cyclohexene-1,2-dicarboxylic acid (1.77 g) + phthalic acid (1.30 g) + 2,2-dimethylgultaric acid (1.25 g) | Cis-4-cyclohexene-1,2-dicarboxylic acid (1.81 g) + L-gultamic acid (0.59 g) + phthalic acid (0.66 g) + 2,2-dimethylgultaric acid (1.28 g) |

TABLE 6-continued

| Example No. | | Example 17 | Example 18 |
|---|---|---|---|
| | Epoxy Resin | AER260 (10 g) | AER260 (8.19 g) + CY184 (1.81 g) |
| | Alcohol | Triethylene glycol (0.86 g) + Amylalcohol (1.29 g) | Triethylene glycol (0.86 g) + Amylalcohol (1.29 g) |
| Ratio of Equivalent of Carboxylic Group | | 0.4 + 0.3 + 0.3 | 0.4 + 0.15 + 0.15 + 0.3 |
| Ratio of Equivalent of Epoxy group | | 1 | 0.8 + 0.2 |
| Amount of Alcohol (wt %) | | 5 + 8 | 5 + 8 |
| Initiation Temperature of Reaction | | 128 | 132 |
| Temperature at the top of Exothermic Peak | | 185~203 | 190~210 |
| Solder | | Sn—Ag—Cu—Ni—Ge | Sn—Ag—Cu—Ni—Ge |
| Ratio of Wetting Spreading (%) | Initiation | 89.2 | 90.1 |
| | 2 months | 89.9 | 91.0 |
| | 4 months | 89.0 | 90.9 |
| Solder | | Sn—Ag—Cu | Sn—Ag—Cu |
| Ratio of Wetting Spreading (%) | Initiation | 87.5 | 88.6 |
| | 2 months | 87.5 | 89.0 |
| | 4 months | 87.4 | 88.9 |
| Electrical Insulation ($\Omega$) | Initiation | $4.0 \times 10^9$ | $8.0 \times 10^8$ |
| | 168 hours | $8.0 \times 10^9$ | $1.0 \times 10^9$ |
| Inhibition of silicone gel from curing | | No inhibition | No inhibition |

Comparative Example 1

Soldering was carried out in a way similar to Example 2, using an increased amount of 6.69 g of triethylene glycol (33 wt % by weight based on the total weight of the flux in the present Comparative Example) instead of 4.01 g of triethylene glycol in Example 2 (23 wt % by weight based on the total weight of the flux in Example 2). Although the ratio of wetting spreading of the solder was 90.3%, there was an inhibition of the sealing resin of silicone gel from curing when the residual flux was not cleansed off. Table 7 shows the compounding ratio and properties of the soldering flux and properties of the solder composition used in the present Comparative Example.

Comparative Example 2

Soldering was carried out in a way similar to Example 1, using an increased amount of 7.72 g of triethylene glycol (35 wt % by weight based on the total weight of the flux in the present Comparative Example) instead of 4.01 g of triethylene glycol in Example 1 (23 wt % by weight by weight based on the total weight of the flux in Example 1). Although the ratio of wetting spreading of the solder was 83.9%, there was an inhibition of the sealing resin of silicone gel from curing when the residual flux was not cleansed off. Table 7 shows the compounding ratio and properties of the soldering flux and properties of the solder composition used in the present Comparative Example.

Comparative Example 3

Soldering was carried out in a way similar to Example 5, so that AER 260 and itaconic acid in Example 5 were compounded at a ratio of 1 equivalent of the epoxy group to 0.7 equivalent of the carboxyl group. Although there was no inhibition of the sealing resin of silicone gel from curing even when the residual flux was cleansed off, the ratio of wetting spreading of the solder was lowered to 78.3% compared to that in Example 5. Table 7 shows the compounding ratio and properties of the soldering flux and properties of the solder composition used in the present Comparative Example.

Comparative Example 4

Soldering was carried out in a way similar to Example 5, so that AER 260 and itaconic acid in Example 5 were compounded at a ratio of 1 equivalent of the epoxy group to 2.1 equivalent of the carboxyl group. Although there was no inhibition of the sealing resin of silicone gel from curing even when the residual flux was cleansed off, the ratio of wetting spreading of the solder was lowered to 77.3% compared to that in Example 5. Table 8 shows the compounding ratio and properties of the soldering flux and properties of the solder composition used in the present Comparative Example.

Comparative Example 5

Soldering was carried out in a way similar to Example 12, so that AER 260 and cis-4-cyclohexene-1,2-dicarboxylic acid in Example 12 were compounded at a ratio of 1 equivalent of the epoxy group to 0.7 equivalent of the carboxyl group. Although there was no inhibition of the sealing resin of silicone gel from curing even when the residual flux was cleansed off, the ratio of wetting spreading of the solder was lowered to 79.3% compared to that in Example 21. Table 8 shows the compounding ratio and properties of the soldering flux and properties of the solder composition used in the present Comparative Example.

Comparative Example 6

Soldering was carried out in a way similar to Example 12, so that AER 260 and cis-4-cyclohexene-1,2-dicarboxylic acid in Example 12 were compounded at a ratio of 1 equivalent of the epoxy group to 2.1 equivalent of the carboxyl group. Although there was no inhibition of the sealing resin of silicone gel from curing even when the residual flux was cleansed off, the ratio of wetting spreading of the solder was lowered to 82.2% compared to that in Example 12, and the electrical insulation of the cured flux was lowered. Table 8 shows the compounding ratio and properties of the soldering flux and properties of the solder composition used in the present Comparative Example.

TABLE 7

| Comparative Example No. | | Comparative Example 1 | Comparative Example 2 | Comparative Example 3 |
|---|---|---|---|---|
| Flux components | Carboxylic Acid | Itaconic acid (3.38 g) | Cis-4-cyclohexene-1,2-dicarboxylic acid (4.43 g) | Itaconic acid (2.37 g) |
| | Epoxy Resin | AER260 (10 g) | AER260 (10 g) | AER260 (10 g) |
| | Alcohol | Triethylene glycol (6.69 g) | Triethylene glycol (7.72 g) | Triethylene glycol (3.71 g) |
| Ratio of Equivalent of Carboxylic Group | | 1 | 1 | 0.7 |
| Ratio of Equivalent of Epoxy group | | 1 | 1 | 1 |
| Amount of Alcohol (wt %) | | 33 | 35 | 23 |
| Initiation Temperature of Reaction | | 70 | 136 | 121 |
| Temperature at the top of Exothermic Peak | | 198 | 205 | 209 |
| Solder | | Sn—Ag—Cu—Ni—Ge | Sn—Ag—Cu—Ni—Ge | Sn—Ag—Cu—Ni—Ge |
| Ratio of Wetting Spreading (%) | Initiation | 83.9 | 90.3 | 78.3 |
| | 2 months | 76.3 | 91.0 | 70.3 |
| | 4 months | — | 90.6 | — |
| Solder | | Sn—Ag—Cu | Sn—Ag—Cu | Sn—Ag—Cu |
| Ratio of Wetting Spreading (%) | Initiation | — | — | — |
| | 2 months | — | — | — |
| | 4 months | — | — | — |
| Electrical Insulation ($\Omega$) | Initiation | $6.0 \times 10^7$ | $9.0 \times 10^6$ | $3.0 \times 10^8$ |
| | 168 hours | $1.0 \times 10^8$ | $8.0 \times 10^6$ | $9.0 \times 10^8$ |
| Inhibition of silicone gel from curing | | Inhibition | Inhibition | No Inhibition |

TABLE 8

| Comparative Example No. | | Comparative Example 4 | Comparative Example 5 | Comparative Example 6 |
|---|---|---|---|---|
| Flux components | Carboxylic Acid | Itaconic acid (7.10 g) | Cis-4-cyclohexene-1,2-dicarboxylic acid (3.10 g) | Cis-4-cyclohexene-1,2-dicarboxylic acid (9.30 g) |
| | Epoxy Resin | AER260 (10 g) | AER260 (10 g) | AER260 (10 g) |
| | Alcohol | Triethylene glycol (5.13 g) | Triethylene glycol (2.62 g) | Triethylene glycol (3.86 g) |
| Ratio of Equivalent of Carboxylic Group | | 2.1 | 0.7 | 2.1 |
| Ratio of Equivalent of Epoxy group | | 1 | 1 | 1 |
| Amount of Alcohol (wt %) | | 23 | 17 | 17 |
| Initiation Temperature of Reaction | | 127 | 136 | 146 |
| Temperature at the top of Exothermic Peak | | 184 | 198 | 203 |
| Solder | | Sn—Ag—Cu—Ni—Ge | Sn—Ag—Cu—Ni—Ge | Sn—Ag—Cu—Ni—Ge |
| Ratio of Wetting | Initiation | 77.3 | 79.3 | 82.2 |
| | 2 months | 72.3 | 78.9 | 83.2 |

TABLE 8-continued

| Comparative Example No. | | Comparative Example 4 | Comparative Example 5 | Comparative Example 6 |
|---|---|---|---|---|
| Spreading (%) | 4 months | — | 77.9 | 83.0 |
| Solder | | Sn—Ag—Cu | Sn—Ag—Cu | Sn—Ag—Cu |
| Ratio of Wetting | Initiation | — | — | — |
| | 2 months | — | — | — |
| Spreading (%) | 4 months | — | — | — |
| Electrical Insulation (Ω) | Initiation | $2.0 \times 10^7$ | $3.0 \times 10^8$ | $2.0 \times 10^7$ |
| | 168 hours | $9.0 \times 10^6$ | $7.0 \times 10^8$ | $1.0 \times 10^7$ |
| Inhibition of silicone gel from curing | | No inhibition | No inhibition | No inhibition |

The present invention has been described in detail with respect to preferred embodiment, and it will now be that changes and embodiments may be made without departing from the invention in its broader aspects, and it is the invention, therefore, in the appended claims to cover all such changes and modifications as fall within the true spirit of the invention.

What is claimed is:

1. A soldering flux containing an epoxy resin and an organic carboxylic acid, wherein said epoxy resin and said organic carboxylic acid are compounded at a ratio of 1.0 equivalent of epoxy group in said epoxy resin to 0.8–2.0 equivalent of carboxyl group in said organic carboxylic acid, and total amount of said epoxy resin and said organic carboxylic acid is 70% or more by weight based on said total weight of said soldering flux.

2. The soldering flux of claim 1, wherein temperature at the top of an exothermic peak in flux-curing reaction in which said epoxy resin and said organic carboxylic acid are polymerized is 180–250° C.

3. The soldering flux of claim 1, wherein initiation temperature of flux curing reaction in which said epoxy resin and said organic carboxylic acid are polymerized is 180–230° C.

4. The soldering flux of claim 1, wherein said epoxy resin and said organic carboxylic acid are compounded at a ratio of 1.0 equivalent of said epoxy group in said epoxy resin to 0.8–1.1 equivalent of said carboxyl group in said organic carboxylic acid.

5. The soldering flux of claim 1, wherein said total amount of the epoxy resin and the organic carboxylic acid contained is 80% or more by weight based on the total weight of said soldering flux.

6. The soldering flux of claim 1, further containing 30% or less by weight of alcohols based on said total weight of said soldering flux.

7. The soldering flux of claim 6, further containing 20% or less by weight of said alcohols based on said total weight of said soldering flux.

8. The soldering flux of claim 1, wherein said epoxy resin is selected from the group consisting of bisphenol-A type epoxy resins, bisphenol-F type epoxy resins, novolac type epoxy resins, alicyclic epoxy resins and mixtures thereof.

9. The soldering flux of claim 8, wherein said bisphenol-A type epoxy resins have about 160–250 g/eq of epoxy equivalent.

10. The soldering flux of claim 1, wherein said carboxylic acid is selected from the group consisting of saturated aliphatic dicarboxylic acids, unsaturated aliphatic dicarboxylic acids, alicyclic dicarboxylic acids, aromatic dicarboxylic acids, amino group containing carboxylic acids, hydroxyl group containing carboxylic acids, heterocyclic dicarboxylic acids and mixtures thereof.

11. The soldering flux of claim 1, wherein said carboxylic acid is selected from the group consisting of succinic acid, glutaric acid, adipic acid, azelaic acid, dodecanoic diacid, itaconic acid, mesaconic acid, cyclobutanedicarboxylic acid, cyclohexanedicarboxylic acid, cyclohexenedicarboxylic acid, cyclopentanetetracarboxylic acid, dimethylglutaric acid, methyladipic acid, glutamic acid, ethylenediaminetetraacetic acid, citric acid, malic acid, tartaric acid, pyrazindicarboxylic acid, phenylenediacetic acid, catecholdiacetic acid, hydroquinonediacetic acid, thiopropionic acid, thiodibutyl acid, dithioglycolic acid and mixtures thereof.

12. The soldering flux of claim 1, wherein said carboxylic acid is selected from the group consisting of cyclohexanedicarboxylic acid, dimethylglutaric acid, glutamic acid, phthalic acid and mixtures thereof.

13. The soldering flux of claim 6, wherein said alcohols is selected from the group consisting of monoalcohols, polyhydric alcohols, and mixture thereof.

14. The soldering flux of claim 13, wherein said polyhydric alcohol is selected from the group consisting of ethylene glycol, diethylene glycol, triethylene glycol, propylene glycol, octene glycol, polyethylene glycol, propanediol, glycelin and mixtures thereof.

15. The soldering flux of claim 13, wherein said monoalcohol is selected from the group consisting of methyl alcohol, ethyl alcohol, propyl alcohol, butyl alcohol, isobutyl alcohol, amyl alcohol, isoamyl alcohol, octanol, allyl alcohol, cyclohexanol and mixtures thereof.

16. A solder composition, wherein said solder composition contains said soldering flux according to claim 1 and lead-free solder having a melting point of 190–240° C.

17. The soldering composition according to claim 16, wherein said lead-free solder is Sn containing lead-free solder having a melting point of 190–240° C.

18. A soldering flux containing an epoxy resin and an organic carboxylic acid, wherein said epoxy resin and said organic carboxylic acid are compounded at a ratio of 1.0 equivalent of epoxy group in said epoxy resin to 0.8–1.1 equivalent of carboxyl group in said organic carboxylic acid, and total amount of said epoxy resin and said organic carboxylic acid is 70% or more by weight based on said total weight of said soldering flux, wherein said carboxylic acid is selected from the group consisting of succinic acid, glutaric acid, adipic acid, azelaic acid, dodecanoic diacid, itaconic acid, mesaconic acid, cyclobutanedicarboxylic acid, cyclohexanedicarboxylic acid, cyclohexenedicarboxylic acid, cyclopentanetetracarboxylic acid, dimethylglutaric acid, methyladipic acid, glutamic acid, ethylenediaminetetraacetic acid, citric acid, malic acid, tartaric acid, pyrazindicarboxylic acid, phenylenediacetic acid, catecholdiacetic acid, hydroquinonediacetic acid, thiopropionic acid, thiodibutyl acid, dithioglycolic acid and mixtures thereof, wherein a temperature at the top of an exothermic peak in flux-curing reaction in which said epoxy resin and said organic carboxylic acid are polymerized is 180–250° C. or an initiation temperature of flux curing reaction in which said epoxy resin and said organic carboxylic acid are polymerized is 180–230° C.

19. The soldering flux of claim 18, further containing 30% or less by weight of alcohols based on said total weight of said soldering flux.

20. A solder composition, wherein said solder composition contains said soldering flux according to claim 18 and lead-free solder having 190–240° C. of melting point.

* * * * *

UNITED STATES PATENT AND TRADEMARK OFFICE
CERTIFICATE OF CORRECTION

PATENT NO.   : 6,641,679 B2
DATED        : November 4, 2003
INVENTOR(S)  : Tsutomu Nishina and Kenji Okamoto It is certified that error appears in the above-identified patent and that said Letters Patent is hereby corrected as shown below:

<u>Column 4,</u>
Line 25, change "0.8% by weight" to -- 0.8 equivalents --
Line 29, change "2.0% by weight" to -- 2.0 equivalents --

Signed and Sealed this

Thirtieth Day of December, 2003

JAMES E. ROGAN
*Director of the United States Patent and Trademark Office*